(12) United States Patent
Mangaiahgari et al.

(10) Patent No.: US 11,171,777 B2
(45) Date of Patent: Nov. 9, 2021

(54) WIRELESS COMMUNICATION WITH NON-NETWORKED CONTROLLERS

(71) Applicant: Carrier Corporation, Palm Beach Gardens, FL (US)

(72) Inventors: Phani Pavan Kumar Mangaiahgari, Hyderabad (IN); David V. Soergel, Jamesville, NY (US); Aryn Shapiro, Liverpool, NY (US); Doug Schiffer, Syracuse, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 313 days.

(21) Appl. No.: 16/273,587

(22) Filed: Feb. 12, 2019

(65) Prior Publication Data

US 2019/0253241 A1 Aug. 15, 2019

(30) Foreign Application Priority Data

Feb. 12, 2018 (IN) .............................. 201811005141

(51) Int. Cl.
| | |
|---|---|
| *H04L 9/08* | (2006.01) |
| *H04L 9/32* | (2006.01) |
| *H04L 29/06* | (2006.01) |
| *G06F 21/36* | (2013.01) |
| *H04W 12/069* | (2021.01) |

(52) U.S. Cl.
CPC .............. *H04L 9/085* (2013.01); *G06F 21/36* (2013.01); *H04L 9/3213* (2013.01); *H04L 9/3228* (2013.01); *H04L 63/0823* (2013.01); *H04L 63/10* (2013.01); *H04L 63/068* (2013.01); *H04L 63/0876* (2013.01); *H04W 12/069* (2021.01)

(58) Field of Classification Search
CPC ..... H04L 9/085; H04L 9/3228; H04L 9/3213; H04L 63/10; H04L 63/0823; H04L 63/0876; H04L 63/068; H04L 9/0863; H04L 9/3263; H04L 63/083; G06F 21/36; G06F 21/46; H04W 12/069; G06Q 10/083
See application file for complete search history.

(56) References Cited

U.S. PATENT DOCUMENTS 7,512,398 B2 3/2009 Chambers et al.
7,624,280 B2 11/2009 Oskari
(Continued)

FOREIGN PATENT DOCUMENTS

| CN | 105696870 A | 6/2016 |
|---|---|---|
| WO | 2017098217 A1 | 6/2017 |

OTHER PUBLICATIONS

Singapore Search Report and Written Opinion for Application No. 10201901169Y; dated Jan. 14, 2020; 8 Pages.
(Continued)

*Primary Examiner* — Matthew Smithers
(74) *Attorney, Agent, or Firm* — Cantor Colburn LLP

(57) ABSTRACT

A computer-implemented method and system for controlling remote access to a computer system is disclosed. A method includes generating a secret value at a first computer system; sharing the secret value with associated computer systems; choosing a time length for validity; computing a derived key based on the secret value; and controlling remote access to the computer system based on the derived key and a unique identifier associated with the first computer system.

14 Claims, 6 Drawing Sheets

(56) References Cited

U.S. PATENT DOCUMENTS

| | | | |
|---|---|---|---|
| 8,335,488 B2 | 12/2012 | Despain et al. | |
| 8,869,576 B2 | 10/2014 | O'Leary et al. | |
| 9,049,013 B2 | 6/2015 | Paczkowski et al. | |
| 9,218,476 B1* | 12/2015 | Roth | H04L 63/0838 |
| 9,432,361 B2 | 8/2016 | Mahaffey et al. | |
| 9,659,422 B2 | 5/2017 | Lovelock et al. | |
| 9,659,424 B2 | 5/2017 | Huber et al. | |
| 10,785,199 B1* | 9/2020 | Chhabra | H04L 63/045 |
| 2006/0256961 A1* | 11/2006 | Brainard | H04L 9/0844 |
| | | | 380/44 |
| 2007/0001855 A1 | 1/2007 | Bohman et al. | |
| 2008/0230606 A1* | 9/2008 | Thompson | E05B 39/00 |
| | | | 235/385 |
| 2009/0267743 A1* | 10/2009 | Faroe | H04Q 9/00 |
| | | | 340/10.1 |
| 2011/0128121 A1* | 6/2011 | Shachar | G07C 9/00309 |
| | | | 340/5.24 |
| 2012/0229251 A1 | 9/2012 | Ufkes | |
| 2013/0257589 A1* | 10/2013 | Mohiuddin | G07C 9/00309 |
| | | | 340/5.61 |
| 2013/0257590 A1 | 10/2013 | Kuenzi et al. | |
| 2013/0335193 A1 | 12/2013 | Hanson et al. | |
| 2015/0143108 A1* | 5/2015 | Demeter | H04L 9/0891 |
| | | | 713/158 |
| 2015/0188899 A1* | 7/2015 | Bakar | H04L 63/10 |
| | | | 726/9 |
| 2015/0228133 A1 | 8/2015 | Capaldi-Tallon | |
| 2016/0191245 A1 | 6/2016 | Qin | |
| 2016/0308858 A1 | 10/2016 | Nordstrom et al. | |
| 2018/0114386 A1* | 4/2018 | Steinmetz | E05B 39/005 |

OTHER PUBLICATIONS

European Search Report for U.S. Appl. No. 19/156,732, dated Apr. 16, 2019, 19 pages.

Wikipedia, "Public key certificate", available at: https://en.wikipedia.org/w/index.php?title=Public_key_ceritifcate&oldid=821909747, Tuesday, May 14, 2019, 10 pages.

\* cited by examiner

WIRELESS COMMUNICATION WITH NON-NETWORKED CONTROLLERS

FOREIGN PRIORITY

This application claims priority to Indian Patent Application No. 201811005141, filed Feb. 12, 2018, and all the benefits accruing therefrom under 35 U.S.C. § 119, the contents of which in its entirety are herein incorporated by reference.

BACKGROUND

Exemplary embodiments pertain to the art of electronics. In particular, the present disclosure relates to a method and system for improving communication with non-network controllers.

Goods are often transported across great distances, sometimes using a variety of different modes of transportation. One common method of transporting goods in such a manner is the use of intermodal shipping containers. Such containers are of a standardized size, such that multiple containers are easily handled and stacked. A common size is 8 feet (2.44 m) wide by 8 feet, 6 inches (2.59 m) high, with a length of either 20 feet (6.1 m) or 40 feet (12.2 meters). Other lengths can be used, such as 45 feet (13.7 m), 48 feet (14.6 m), and 53 feet (16.2 m). The benefit of standardized intermodal containers is that goods can be shipped from a variety of different locations without ever having to be removed from the container. The container itself is moved to and from a trailer, rail carrier, or ship.

Some containers include computerized portions. For example, a refrigerated container can have a computer that is used to monitor or control the refrigeration unit. The computer could, for example, change the temperature of the refrigerated container. In addition, the container can monitor the refrigerated container. One can determine the maximum temperature reached in the container, the status of the refrigerant or any electronics of the computer.

An issue that can occur is that it can be difficult to access the computer of each container. Intermodal shipping containers are typically constructed such that they are stackable and can be packed in tight quarters. Therefore, there can be 6 to 12 containers in a single stack of containers. To maximize the number of containers on a ship or at a shipping facility, the containers can be placed very close to each other. Accessing a single container in such a configuration can be difficult.

BRIEF DESCRIPTION

According to one embodiment, a method and system for controlling remote access to a computer system is disclosed. A method includes generating a secret value at a first computer system; sharing the secret value with associated computer systems; choosing a time length for validity; computing a derived key based on the secret value; and controlling remote access to the computer system based on the derived key and a unique identifier associated with the first computer system.

In addition to one or more features described above, or as an alternative, further embodiments may include wherein the first computer system controls operations of an intermodal shipping container.

In addition to features described above, or as an alternative, further embodiments may include wherein the unique identifier is a serial number associated with the intermodal shipping container.

In addition to features described above, or as an alternative, further embodiments may include wherein the associated computer systems include computer systems operated by a common entity.

In addition to features described above, or as an alternative, further embodiments may include wherein the derived key is generated using a key derivation function.

In addition to features described above, or as an alternative, further embodiments may include validating one or more certificates received from a remote computer system; and transmitting a session token to the remote computer system, in the case where the one or more certificates are validated.

In addition to features described above, or as an alternative, further embodiments may include granting access to the remote computer system based on receiving the session token.

According to one embodiment, a method and system for gaining remote access to a first computer system is disclosed. The method includes accepting a derived key and a unique identifier as an input at a remote computer system; computing a passkey based on the derived key and the unique identifier; transmitting the passkey to the first computer system; receiving a session token from the first computer system; and establishing a secure session with the first computer system using the session token.

In addition to features described above, or as an alternative, further embodiments may include wherein transmitting the passkey to the first computer system further comprises transmitting one or more certificates to the first computer system.

In addition to features described above, or as an alternative, further embodiments may include wherein the one or more certificates include a customer certificate and a mobile certificate.

In addition to features described above, or as an alternative, further embodiments may include wherein the one or more certificates are received from a certificate-granting authority upon proof of authorization.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be noted that, although aspects are discussed in conjunction with refrigerated containers, embodiments can be used with any type of computing device.

As described above, intermodal shipping containers are very useful for shipping goods through long distances, without the need to load and unload a single container multiple times through the journey. Certain intermodal containers are computerized, such as refrigerated intermodal containers. It can be desirable to access the computer of an intermodal shipping container to control or monitor the container. However, it can be difficult to do so.

Figure 4:
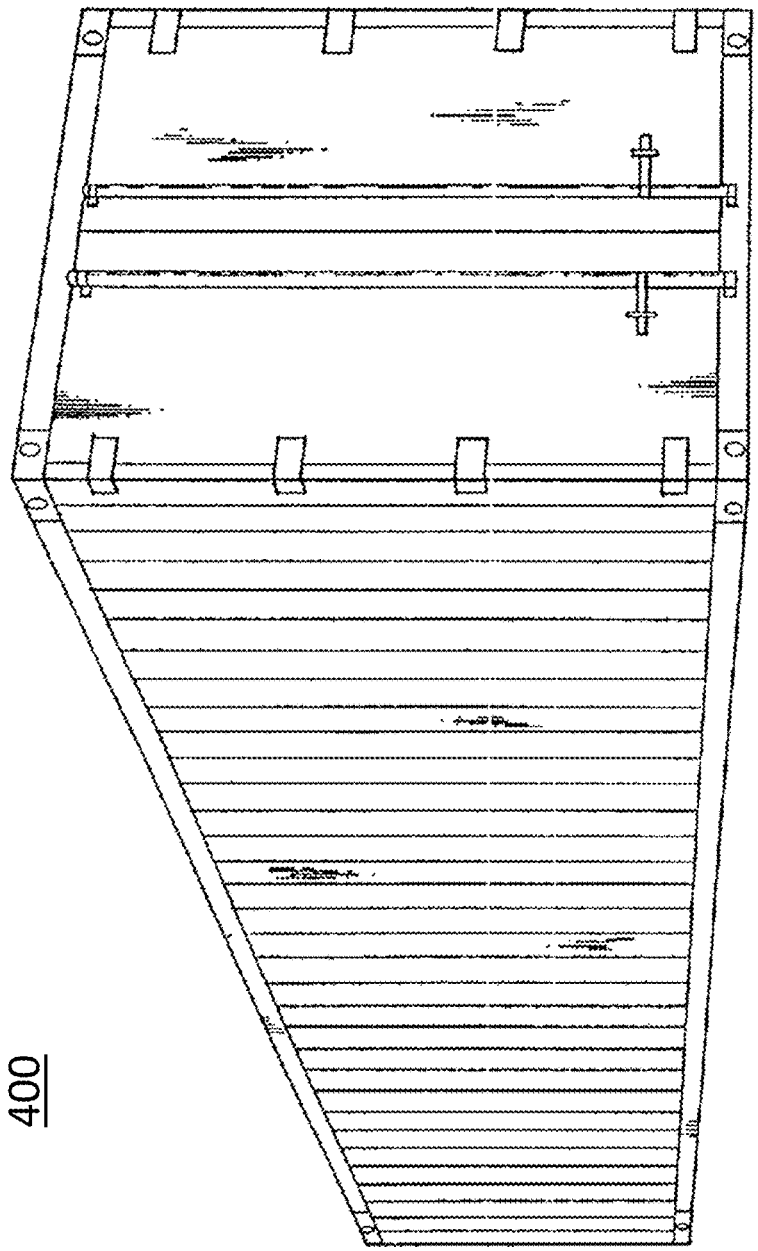
FIG. 4 is an isometric projection of an exemplary intermodal container

Containers are standardized sizes such that they can be stacked. As described above, a common size of a container 8 feet (2.44 m) wide by 8 feet, 6 inches (2.59 m) high, with a length of either 20 feet (6.1 m) or 40 feet (12.2 meters). Other lengths can be used, with typical available lengths including 45 feet (13.7 m), 48 feet (14.6 m), and 53 feet (16.2 m). A typical container 400 is illustrated in isometric view in FIG. 4. The stack of container can be upwards of 12 containers high. Therefore a stack of containers that is 8 containers high is 68 feet (20.7 meters) off the ground. It would be inconvenient to have to manually access the computer system of a container that is 20 meters off the ground.

It could be possible to establish a wireless connection to the computer system in the container. However, a difficulty arises because a specific container can have characteristics that change for each shipment. For example, a first shipment of a specific container may be carried out by shipping company A. But the next week, the same container in the same ship yard is being used by shipping company B. Therefore, with each shipment, a worker might have to access a completely different set of containers to check their status or change settings. Thus, management of security can be difficult. Containers operate in a highly disconnected environment where management of access credentials (either locally or on servers) is not possible. Cloud connections can be difficult because there can be instances where access to the Internet is difficult (such as on a cargo ship). Thus, access of authentication remains a problem.

Another difficulty is security. Containers are secured by physical security, such as fences and allowing only authorized personnel to have access to secured areas. The use of wireless computing capability could permit bad actors to access otherwise secured computers via a wireless computer connection by wirelessly connecting to a container's computer system while the bad actor is located outside the secured area.

In one or more embodiments, a computer system is equipped with a local display that can be used to configure and monitor the computer system via a wireless connection. The local display is used to show a high entropy secure token (such as a derived key) that is used to wirelessly connect to the computer system. All computer systems associated with the same customer is configured to generate the same secure token. Thus, a worker can access multiple computer systems while only physically accessing one of the computer systems. Moreover, because physical access to at least one computer system is present, physical security is present.

Figure 1:
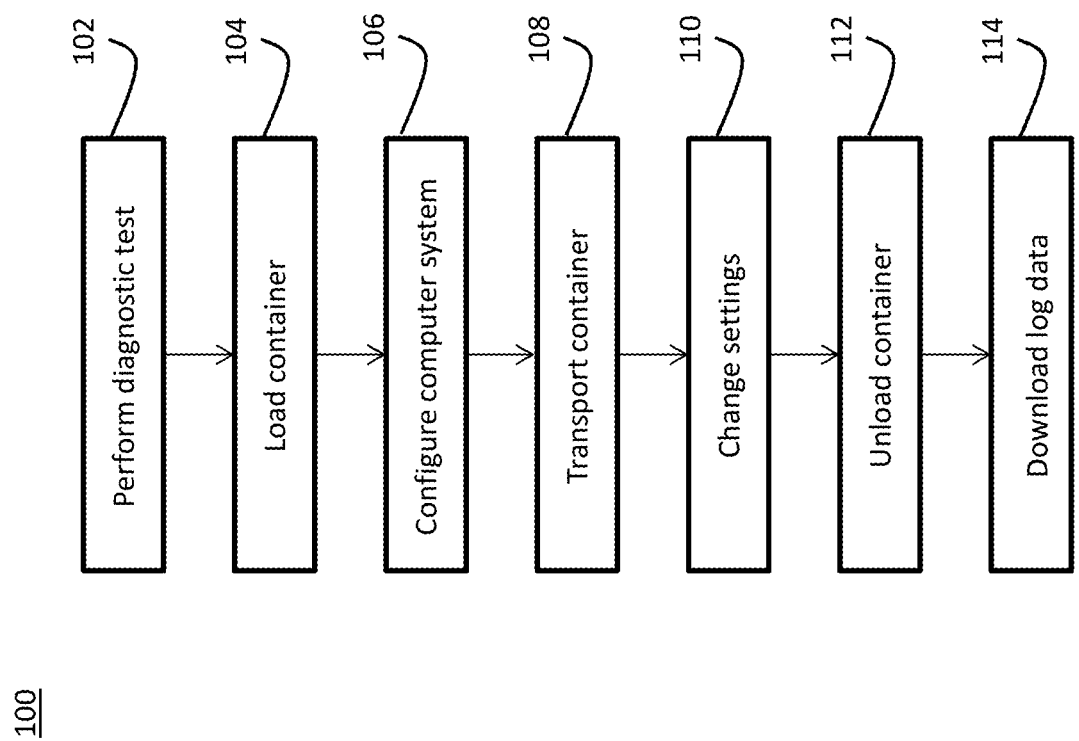
FIG. 1 is a flow diagram illustrating the travel cycle of an exemplary container.

With respect to FIG. 1, the journey cycle 100 of a container is illustrated, for background purposes. For purposes of FIG. 1, it should be understood that the container in question includes a computer system, such as one to operate a refrigeration unit. A diagnostic test is performed on the computer system (block 102). In some instances, such a test may be considered optional. Cargo is loaded onto the container (block 104). The computer system of the container is configured (block 106). For a refrigerated container, this can include the setting of a temperature, duty cycle, checking the health of the refrigeration unit, and the like. Thereafter, the container is transported (block 108).

For an intermodal container, the process of shipment can take place in a variety of different ways, with the container being transferred from one shipping method to another without the need for the container being loaded or unloaded. For example, a container can be placed on a trailer, then trucked to a railroad yard. At the railroad yard, the container is transferred to the railway system. The container may travel by rail to a shipyard, where the container is transferred to a large cargo ship. The cargo ship travels across a large body of water to another shipyard, where the container can be transferred to a railroad yard or a truck. This process continues, across a variety of different transportation methods, until the container reaches the destination.

At any point along the trip, a one may wish to access the computer system to perform diagnostics or change a setting (block 110). Once the container reaches the destination, the container is unloaded (block 112). At this point, one may be interested in gathering data from the computer system (block 114). This data can include log data, such as the temperature of the container throughout the transportation of the container. The data be used to determine if maintenance should be performed, determine if any problems were encountered during the journey, or perform any updates to the software.

In order to set up a system and method for wirelessly connecting to the computer system, several factors are considered. For example, the relationship between owner and containers is one to many That is, a single owner is associated with one or more containers (and associated computer system), yet a container is associated with only a single owner at a time. (It should be understood that a container can change ownership for subsequent uses). A representative of an owner should be able to connect with the computer systems they are associated with, but not the computer systems associated with other owners.

Thus, a computer system is assigned a unique identifier. In a container embodiment, the unique identifier is associated with a serial number of the container. In addition, each computer system is synchronized such that it has approximately the same time as other computer systems. This can be accomplished using one of a variety of different time sources, such as network time protocol (NTP), global positioning system (GPS), cellular phone signals, and the like.

A variety of different types of security can be used. For example, to access one of the computer systems (such as a computer system on a container), the access could be via a remote computer system. The remote computer system can be embodied as a desktop computer system, a laptop computer system, a mobile electronic device, a tablet, a smartphone, and the like.

The remote computer system can be protected by one of a variety of different security methods. For example, biometrics (e.g., facial recognition, fingerprints, retinal scans, and the like) can be used to guard access to the remote computer system. Security certificates can be used to verify the identity of the computer system with a remote computer system. Exemplary security certificates can include SSL (secure sockets layer) certificates and PKI (public key infrastructure) signatures. The certificate or signature could have an expiration time of, for example, six months.

The use of a secret authorization code is another method that can be used to grant access to remote computer systems. Such a method can be used in addition to static device authentication and customer authentication credentials. An issue with static device authentication (e.g., authorizing a specific device to be used with the computer systems) or customer authentication credentials (e.g., passwords and biometrics) is that those methods could be leaked if the specific device is stolen. An additional authentication method can include the use of a secret authorization code.

A static secret authentication code (e.g., a password) is not ideal because, once leaked, it becomes very difficult to manage and compromises access to all containers. A dynamic authentication code is preferable. A dynamic authentication code changes on a periodic basis. There are two basic types of dynamic authentication, customer managed and automatically managed. A customer managed dynamic authentication code can be ad hoc, meaning the customer can change the authentication code at will. While this provides better protection than static, it is not manageable for customers. Cloud access is very remote. Thus it is difficult for the customer to manage/communicate the passwords manually across many different railway yards, shipyards, and the like. Thus, an ideal system would have an automatically managed dynamic authentication code. The benefits are that existing on-premises security can be used to prevent access by preventing bad actors from accessing the authentication code. In addition, the dynamic authentication code can change on a regular basis (e.g., every four hours), such that a stolen authentication code is of limited use.

One method of dynamic authentication is a derived key (DK) based authentication. In such a system, a computer system (such as one located at a container) computes a DK authentication. Only a person with physical access or presence at one of the computer systems can read the DK. If a single owner has multiple computer systems (e.g., multiple containers), during a setup phase, each computer system can be configured to generate identical derived keys. Thus, a person only needs to be able to read the DK from a single computer system in order to obtain the DK for each computer system (e.g., a computer system that is stacked 20 meters high). The DK can be time based. In such a manner, each computer system can be setup to reset the DK at a certain time interval (e.g., every four hours). Because the computer systems have synchronized times, the DK resets at approximately the same time. Once the DK is read, it can be used with a remote computer system to access the computer system.

Figure 2:
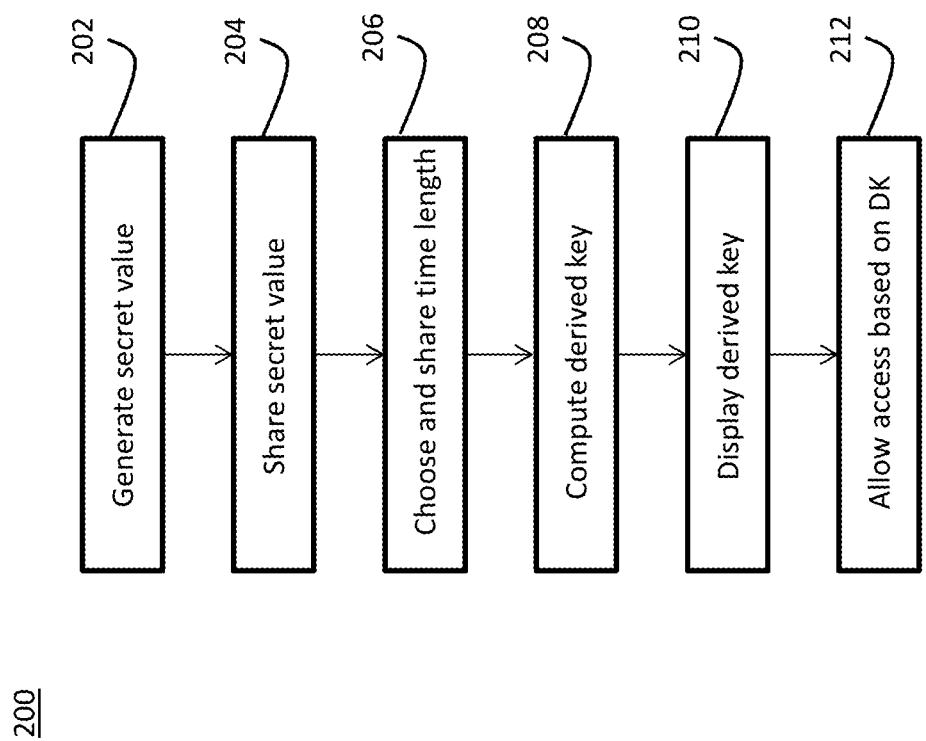
FIG. 2 is a flowchart illustrating the operation of one or more embodiments.

With respect to FIG. 2, a method 200 is presented that illustrates the operation of one or more embodiments. Method 200 is merely exemplary and is not limited to the embodiments presented herein. Method 200 can be employed in many different embodiments or examples not specifically depicted or described herein. In some embodiments, the procedures, processes, and/or activities of method 200 can be performed in the order presented. In other embodiments, one or more of the procedures, processes, and/or activities of method 200 can be combined, skipped, or performed in a different order.

A secret value K is generated (block 202). This secret value is also known as a key. The secret value is generated at a first computer system (such as one connected to a container). The secret value also generated at additional computer systems associated with the first computer system (such as additional containers with the same owner for a particular shipment) (block 204). Because the additional computer systems are synchronized by time as well has customer specific keys or certificates installed during an initial setup process the secret value is the same for each of the additional computer systems. A time length is chosen and shared (block 206). This time length is the length of time a particular derived key will be active. An algorithm is used to create a derived key (DK) (block 208). In some embodiments, the algorithm can be an Argon2 algorithm. Other key derivation algorithms can be used. Thereafter, the DK can be displayed on the first computer system (block 210). The DK displayed on the first computer system can then be entered onto a remote computer system (block 212). Thereafter, the remote computer system is able to access the first computer system, provided it has additional credentials as detailed below (otherwise, a bad actor with binoculars could access the computer system remotely).

In such a manner, a worker using a remote computer system with proper credentials is able to gain access to the first computer system using the DK. Security is present because only a person with physical access to the first computer system is able to view the DK. However, the worker is then able to remotely access any computer system associated with the first computer system, such as other computer systems controlled by the owner.

Figure 3:
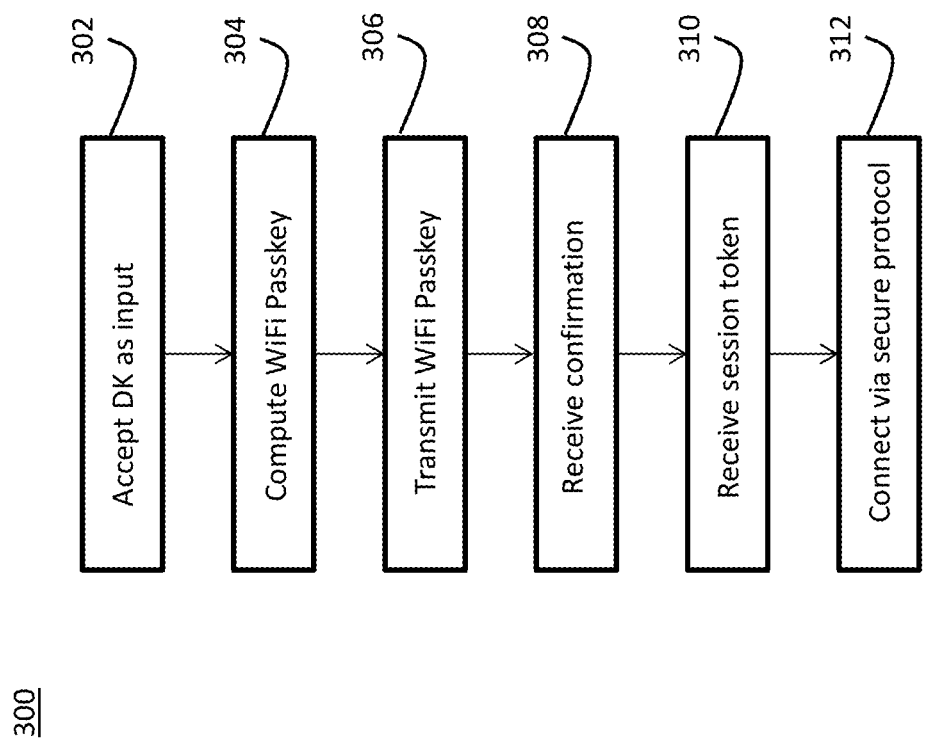
FIG. 3 is a flowchart illustrating the operation of one or more embodiments.

With respect to FIG. 3, a method 300 is presented that illustrates the operation of one or more embodiments. Method 300 is merely exemplary and is not limited to the embodiments presented herein. Method 300 can be employed in many different embodiments or examples not specifically depicted or described herein. In some embodiments, the procedures, processes, and/or activities of method 300 can be performed in the order presented. In other embodiments, one or more of the procedures, processes, and/or activities of method 300 can be combined, skipped, or performed in a different order.

In method 300, a remote computer system operates in the following manner Software operating on the remote computer system accepts a DK as input (block 302). The software computes a WiFi passkey based on the DK (block 304). As part of this computation, the software can also receive a serial number (of the first computer system) as an input. The WiFi passkey is transmitted to the first computer system (block 306). In addition to the DK and serial number, the remote computer system can provide a customer certificate and a mobile certificate (associated with the remote computer system).

The customer certificate and mobile certificate are provided via the software. In some embodiments, when a user downloads the software for use on the remote computer system, the user requests an "unlock code" from the vendor of the software. The unlock code is used to create a customer certificate (to prove that the user of the remote computer system is entitled to view data specific to that customer) and a mobile certificate (to authorize the specific remote computer system) that are transmitted to the remote computer system. In such a manner, one could not just download the software from an "app store" and have access to the features of the software.

The first computer system does a similar computation using the serial number and the DK to confirm that the WiFi passkey is correct and transmit confirmation to the remote computer system (block 308). Based on also receiving valid certificates, the remote computer system receives an expiring session token from the first computer system (block 310). Thereafter, the remote computer system can connect using a secure protocol (such as hypertext transfer protocol secure (HTTPS) (block 312). Thereafter, the remote computer system can be used to check the status of the first computer system, obtain log information, change settings, and the like.

Because each computer system associated with an owner has the same DK (see method 200), the remote computer system is able to access other computer systems using the serial number (or other unique identifier) of the computer system (or container). A worker would typically have access to the serial numbers (or other unique identifier) of each computer system associated with the owner, and could thus gain wireless access to each such computer system, without necessarily having to physically access the computer system (e.g., the container that is 20 meters above the ground).

Figure 5:
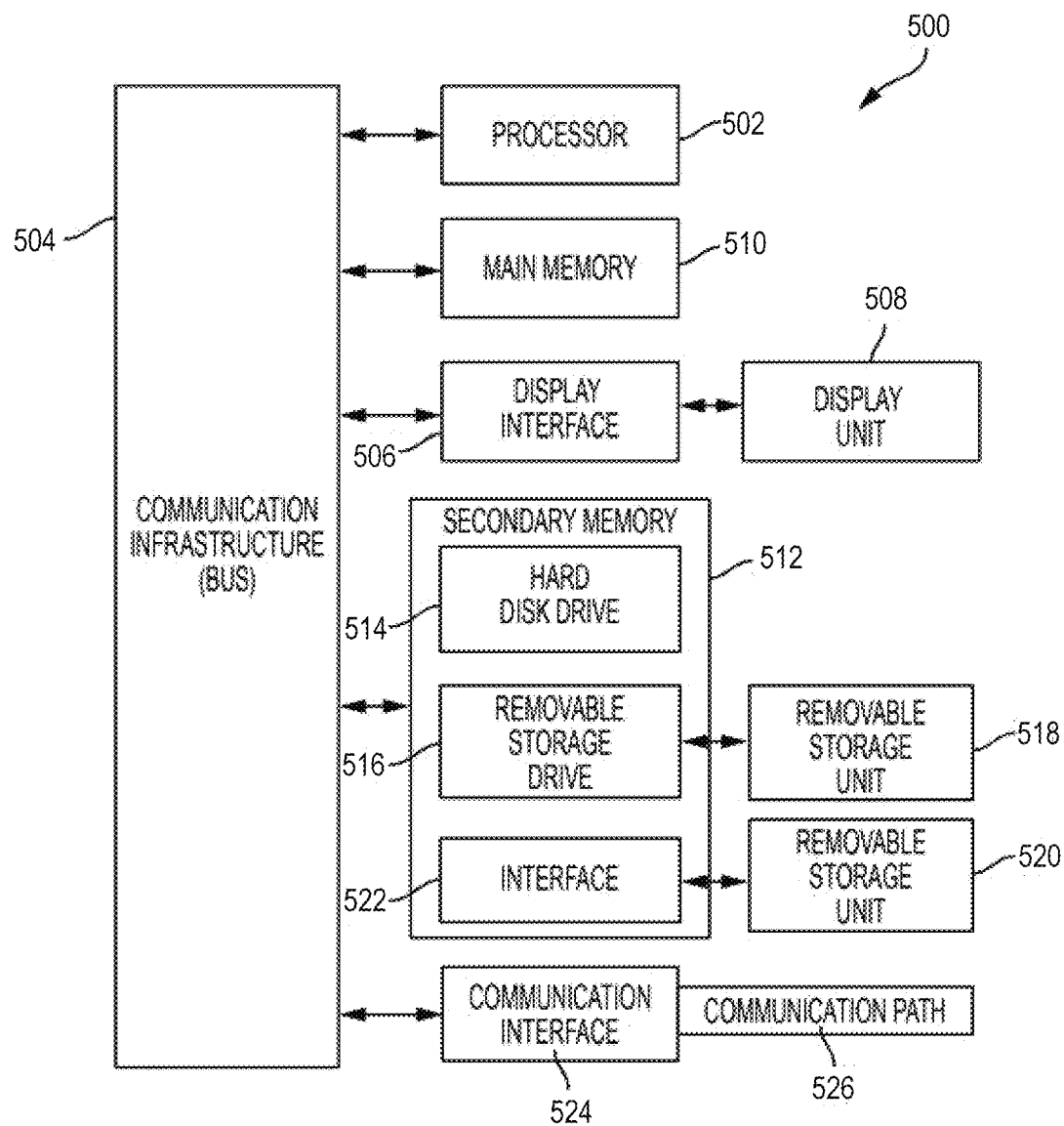
FIG. 5 is a block diagram of an exemplary computer system.

FIG. 5 depicts a high-level block diagram of a computer system 500, which can be used to implement one or more embodiments. More specifically, computer system 500 can be used to implement hardware components of systems capable of performing methods described herein. Although one exemplary computer system 500 is shown, computer system 500 includes a communication path 526, which connects computer system 500 to additional systems (not depicted) and can include one or more wide area networks (WANs) and/or local area networks (LANs) such as the Internet, intranet(s), and/or wireless communication network(s). Computer system 500 and additional system are in communication via communication path 526, e.g., to communicate data between them.

Computer system 500 includes one or more processors, such as processor 502. Processor 502 is connected to a communication infrastructure 504 (e.g., a communications bus, cross-over bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and can also include a secondary memory 512. Secondary memory 512 can include, for example, a hard disk drive 514 and/or a removable storage drive 516, representing, for example, a floppy disk drive, a magnetic tape drive, or an optical disc drive. Hard disk drive 514 can be in the form of a solid state drive (SSD), a traditional magnetic disk drive, or a hybrid of the two. There also can be more than one hard disk drive 514 contained within secondary memory 512. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disc, etc. which is read by and written to by removable storage drive 516. As will be appreciated, removable storage unit 518 includes a computer-readable medium having stored therein computer software and/or data.

In alternative embodiments, secondary memory 512 can include other similar means for allowing computer programs or other instructions to be loaded into the computer system. Such means can include, for example, a removable storage unit 520 and an interface 522. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 520 and interfaces 522 which allow software and data to be transferred from the removable storage unit 520 to computer system 500.

Computer system 500 can also include a communications interface 524. Communications interface 524 allows software and data to be transferred between the computer system and external devices. Examples of communications interface 524 can include a modem, a network interface (such as an Ethernet card), a communications port, or a PC card slot and card, a universal serial bus port (USB), and the like. Software and data transferred via communications interface 524 are in the form of signals that can be, for example, electronic, electromagnetic, optical, or other signals capable of being received by communications interface 524. These signals are provided to communications interface 524 via communication path (i.e., channel) 526. Communication path 526 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 510 and secondary memory 512, removable storage drive 516, and a hard disk installed in hard disk drive 514. Computer programs (also called computer control logic) are stored in main memory 510 and/or secondary memory 512. Computer programs also can be received via communications interface 524. Such computer programs, when run, enable the computer system to perform the features discussed herein. In particular, the computer programs, when run, enable processor 502 to perform the features of the computer system. Accordingly, such computer programs represent controllers of the computer system. Thus it can be seen from the forgoing detailed description that one or more embodiments provide technical benefits and advantages.

Figure 6:
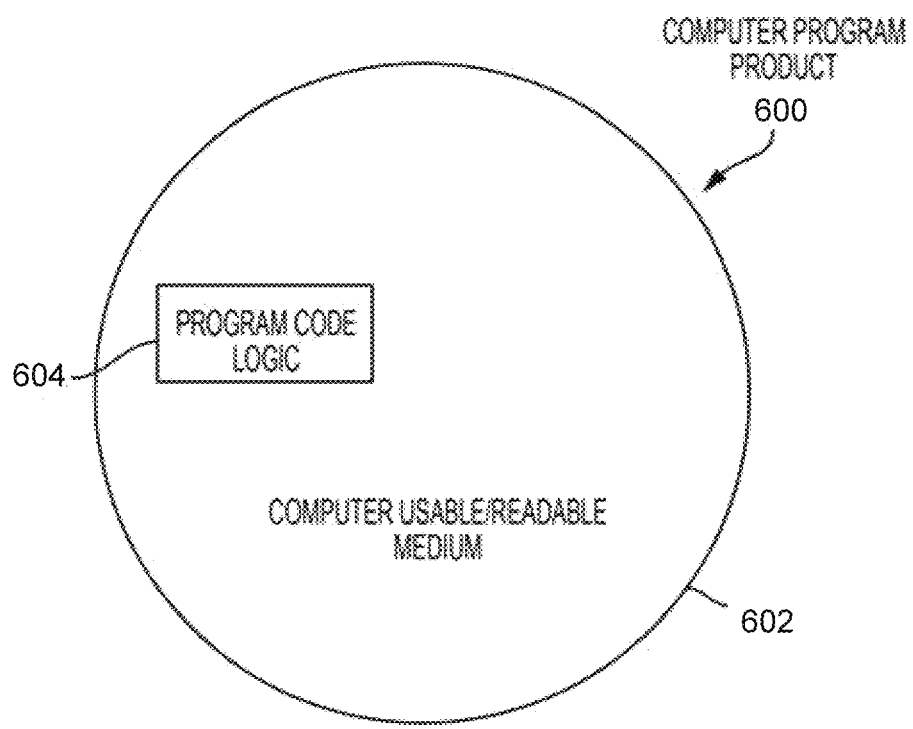
FIG. 6 is a block diagram of an exemplary computer program product.

Referring now to FIG. 6, a computer program product 600 in accordance with an embodiment that includes a computer-readable storage medium 602 and program instructions 604 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A computer-implemented method for controlling access to a first computer system that controls operations of an intermodal shipping container, the method comprising:

generating a secret value at the first computer system;

sharing the secret value with associated computer systems;
choosing a time length for validity;
computing a derived key based on the secret value; and
controlling remote access to the first computer system based on the derived key and a unique identifier associated with the first computer system, wherein the unique identifier is associated with the intermodal shipping container;
wherein remote access to the first computer system is controlled by:
displaying the derived key on the first computer system, allowing a user to read and enter the derived key onto a remote computer system;
computing a passkey based on the derived key and unique identifier;
transmitting the passkey to the first computer system, the first computer system comparing the transmitted passkey with a locally generated one; and
receiving a session token from the first computer system if the comparison results in a match.

2. The computer-implemented method of claim 1 wherein:
the unique identifier is a serial number associated with the intermodal shipping container.

3. The computer-implemented method of claim 1 wherein:
the associated computer systems include computer systems operated by a common entity.

4. The computer-implemented method of claim 1 wherein:
the derived key is generated using a key derivation function.

5. A computer-implemented method for controlling access to a computer system comprising:
generating a secret value at a first computer system;
sharing the secret value with associated computer systems;
choosing a time length for validity;
computing a derived key based on the secret value;
controlling remote access to the computer system based on the derived key and a unique identifier associated with the first computer system;
validating one or more certificates received from a remote computer system; and
transmitting a session token to the remote computer system, in the case where the one or more certificates are validated.

6. The computer-implemented method of claim 5 further comprising:
granting access to the remote computer system based on receiving the session token.

7. A system for controlling access to a first computer system that controls operations of an intermodal shipping container, the system comprising:
a processor;
memory;
the processor configured to perform a method comprising:
generating a secret value at the first computer system;
sharing the secret value with associated computer systems;
choosing a time length for validity;
computing a derived key based on the secret value; and
controlling remote access to the first computer system based on the derived key and a unique identifier associated with the first computer system, wherein the unique identifier is associated with the intermodal shipping container;
wherein remote access to the first computer system is controlled by:
displaying the derived key on the first computer system, allowing a user to read and enter the derived key onto a remote computer system;
computing a passkey based on the derived key and unique identifier;
transmitting the passkey to the first computer system, the first computer system comparing the transmitted passkey with a locally generated one; and
receiving a session token from the first computer system if the comparison results in a match.

8. The system of claim 7 wherein:
the unique identifier is a serial number associated with the intermodal shipping container.

9. The system of claim 7 wherein:
the associated computer systems include computer systems operated by a common entity.

10. The system of claim 7 wherein:
the derived key is generated using a key derivation function.

11. A system for controlling access to a computer system comprising:
a processor;
memory;
the processor configured to perform a method comprising:
generating a secret value at a first computer system;
sharing the secret value with associated computer systems;
choosing a time length for validity;
computing a derived key based on the secret value;
controlling remote access to the computer system based on the derived key and a unique identifier associated with the first computer system;
validating one or more certificates received from a remote computer system; and
transmitting a session token to the remote computer system, in the case where the one or more certificates are validated.

12. The system of claim 11 wherein the method further comprises:
granting access to the remote computer system based on receiving the session token.

13. A computer-implemented method for gaining remote access to a first computer system comprising:
accepting a derived key and a unique identifier as an input at a remote computer system;
computing a passkey based on the derived key and the unique identifier;
transmitting the passkey to the first computer system;
receiving a session token from the first computer system;
establishing a secure session with the first computer system using the session token;
wherein transmitting the passkey to the first computer system further comprises transmitting one or more certificates to the first computer system;
wherein the one or more certificates include a customer certificate and a mobile certificate.

14. A computer-implemented method for gaining remote access to a first computer system comprising:
accepting a derived key and a unique identifier as an input at a remote computer system;
computing a passkey based on the derived key and the unique identifier;

transmitting the passkey to the first computer system;
receiving a session token from the first computer system;
establishing a secure session with the first computer system using the session token;
wherein transmitting the passkey to the first computer system further comprises transmitting one or more certificates to the first computer system;
wherein the one or more certificates are received from a certificate-granting authority upon proof of authorization.

* * * * *